United States Patent [19]

Sareen

[11] 4,314,677

[45] Feb. 9, 1982

[54] JOURNAL AND END CLOSURE FOR TUBULAR VESSELS

[75] Inventor: Bal K. Sareen, Northampton, Pa.

[73] Assignee: Fuller Company, Bethlehem, Pa.

[21] Appl. No.: 158,025

[22] Filed: Jun. 9, 1980

[51] Int. Cl.³ .................. B02C 17/18; B65D 8/08
[52] U.S. Cl. ............................ 241/176; 51/164.1; 138/89; 138/155; 138/172; 220/5 A; 220/71; 241/179; 285/286; 308/73; 403/271
[58] Field of Search ............... 220/5 A, 71, 3, 66, 220/327, 328; 51/164.1; 366/187, 188; 241/176, 178, 179; 285/383, 286; 308/73; 138/155, 172, 89; 403/271

[56] References Cited

U.S. PATENT DOCUMENTS

| | | | |
|---|---|---|---|
| 605,923 | 6/1898 | Schule | 366/187 |
| 1,549,943 | 8/1925 | Whiting | 51/164.1 |
| 1,630,037 | 5/1927 | Stresan | 220/5 A X |
| 2,668,634 | 2/1954 | Arne | 285/286 X |
| 2,673,001 | 3/1954 | Ulm et al. | 220/71 X |
| 3,096,105 | 7/1963 | Risley | 138/155 X |
| 3,185,192 | 5/1965 | Delcellier | 241/178 X |
| 3,272,444 | 9/1966 | Rich et al. | 241/176 |
| 3,558,067 | 1/1971 | Jenness | 241/179 |
| 3,799,383 | 3/1974 | Gerhard | 220/71 X |
| 3,903,439 | 9/1975 | Kartman | 241/176 X |

FOREIGN PATENT DOCUMENTS 468746  7/1914  France ............... 220/5 A

Primary Examiner—Allan N. Shoap
Attorney, Agent, or Firm—Frank H. Thomson

[57] ABSTRACT

A journal and end closure for a tubular vessel particularly a shell supported tubular grinding mill. The mill shell is conventional to the point of the journal. The journal and end closure are formed by a pair of spaced apart cylindrical members and a T-shaped ring member, each secured to one another in an end-to-end relationship by welding. An annular plate is secured by welding to the leg of the T-shaped ring member to form part of the end enclosure for the mill. The T-shaped ring member is made from a material with controlled sulphur and impurity levels. The two cylindrical sections are rolled so that the grain structure of the metal is generally parallel to the longitudinal axis of the tubular vessel. The dimensions of the T-shaped member are selected to prevent high areas of stress from being concentrated at the junction of the T-shaped member with the two cylindrical members and the junction of the annular member with the leg of the T-shaped member.

10 Claims, 7 Drawing Figures

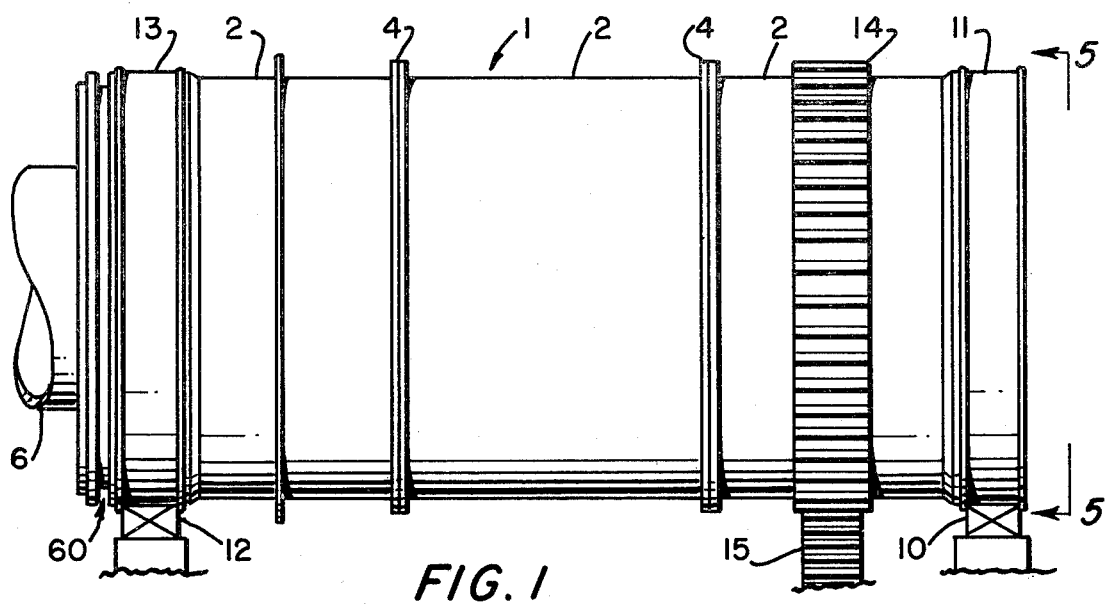
FIG. 1
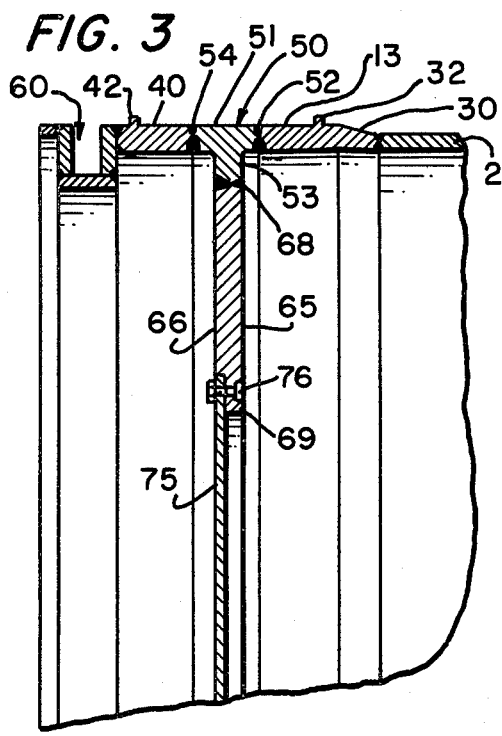
FIG. 3
FIG. 2
PRIOR ART
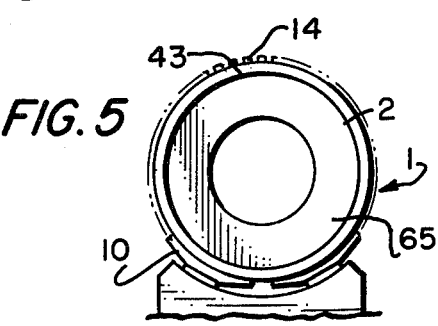
FIG. 5
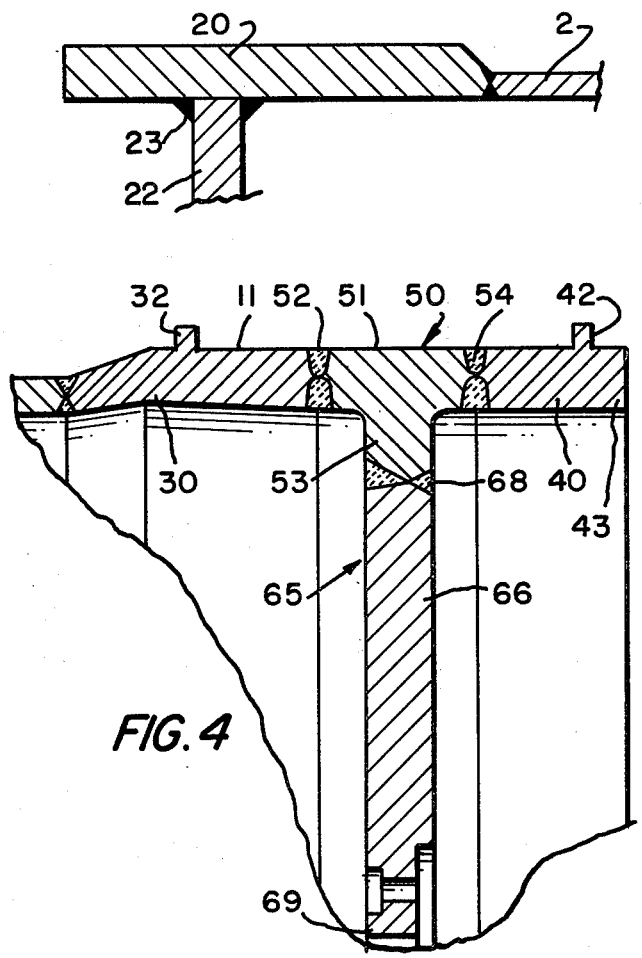
FIG. 4

JOURNAL AND END CLOSURE FOR TUBULAR VESSELS

BACKGROUND OF THE INVENTION

This invention relates to shell supported tubular vessels such as grinding mills and more particularly to a journal and end closure for such mills.

Prior to the present invention, the type of mill to which the present invention relates was generally known. This type of mill and the bearing support arrangement is generally described in U.S. Pat. No. 3,093,426 to A. S. Cornford. Other type of bearings for similar mills are shown in U.S. Pat. Nos. 4,025,133 and 3,887,245. With this type of a mill and bearing arrangement, a cast head and trunnion is not used to close the mill end and form the bearing and journal for supporting the mill. The shell itself serves as the bearing journal.

When compared to other types of mill bearing arrangements, a shell mounted bearing arrangement has the advantage of eliminating heavy castings which can present manufacturing problems such as long delivery times and defective castings. Another advantage of shell mounted bearings for large rotating vessels is that the rotary vessel is supported over a larger diameter than with a head and trunnion arrangement. This serves to reduce the bending moments in the shell itself.

With shell mounted bearing arrangements for tubular vessels, the bearing journal is a heavy section in the vessel shell, usually at each end of the vessel. The bearings usually take the form of a hydrodynamic slide shoe mounted on a frame. During rotation of the vessel a high pressure film of oil separates the slide shoe and journal.

The end closure of the mill of this type is formed by an annular plate or vestigial head welded to the inside of the mill at the journal, perpendicular to the shell. An end plate is secured to the vestigial head to form part of the inlet or outlet of the mill. Prior to the present invention, the vestigial head was welded directly to the heavy plate which forms the bearing journal of the shell. The heavy welds required resulted in the formation of lamellar tears in the base metal of the mill shell. These lamellar tears substantially weaken the mill shell and can result in ultimate failure of the mill at the juncture of the mill head and mill shell. This failure can be troublesome particularly if the mill is used in a wet grinding process in that the failure manifests itself as cracks in the various welds. Wet material leaks through these cracks causing housekeeping problems within the milling facility.

As the tubular vessel rotates, cyclical stresses are produced at the juncture of the vestigial head and the vessel shell. Although the stresses per se are not excessively high, their cyclical nature and the fact that a grinding mill must be capable of withstanding many years of operation and thus many cycles, can lead to failure of the welds at the juncture of the vestigial head and journal.

SUMMARY

It is, therefore, the principal object of this invention to provide a novel journal and end closure for a tubular vessel which is capable of withstanding the cyclical stresses encountered during rotation of the tubular vessel.

It is another object of this invention to provide an article of manufacture which when subjected to cyclical stresses is capable of long life without developing cracks at the junction of the various parts.

In general, the foregoing and other objects of this invention will be carried out by providing a journal and end closure for a rotary tubular vessel which is adapted to be rotatably supported on shoe type bearings comprising a first, hollow, cylindrical member adapted to form part of the tubular vessel; a ring member having a T-shape in cross-section with a first end of the top piece of the T-shape secured by welding to the first cylindrical member and a second end of the top piece of the T-shape; a second hollow cylindrical member having one end secured by welding to the second end of the top piece of the T-shape of said ring member and its other end being a free end of the tubular vessel; said first cylindrical member, said ring member and said second cylindrical member each having substantially the same outside diameter and being substantially coaxially aligned to form a smooth journal; and annular plate means secured by welding to the leg of the T-shape of said ring member for at least partially closing one end of the tubular vessel.

BRIEF DESCRIPTION OF THE DRAWINGS

The invention will be described in connection with the annexed drawings wherein:

FIG. 1 is an elevation of a grinding mill manufactured in accordance with the present invention;

FIG. 2 is a fragmentary sectional view of a portion of a tubular vessel in accordance with the prior art;

FIG. 3 is a fragmentary sectional view of a journal and end closure of a tubular vessel according to the present invention;

FIG. 4 is a fragmentary sectional view on an enlarged scale of a journal and end closure for a tubular according to the present invention;

FIG. 5 is an end view on a reduced scale taken on the line 5—5 of FIG. 1;

DESCRIPTION OF THE PREFERRED EMBODIMENT

Figure 6:
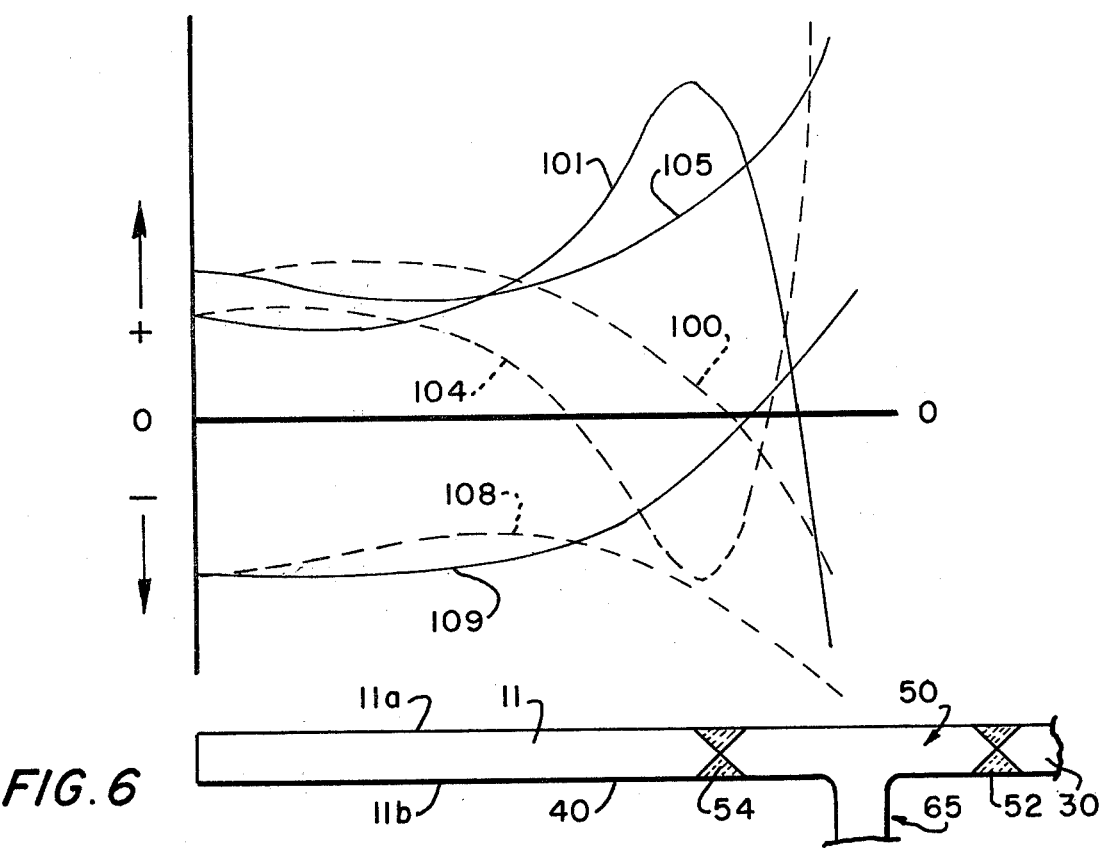
FIG. 6 is a graph showing the transverse bending stress compared to position on the journal as encountered by a journal and end closure.

Referring to FIG. 1 shell supported grinding mill having a journal and end closure in accordance with the present invention is generally designated by the numeral 1. The mill shell 1 may be formed from several sections 2 rolled from suitable steel. Each of these sections are joined together in an end-to-end relationship by means of welding or a bolting flange 4 secured to each end of section 2 to thereby form the rotary tubular vessel or mill 1. The mill may be provided with a suitable inlet, (not shown) for material to be ground and an outlet 6 for ground material. The mill is supported for rotation on slide shoe bearings 10 and 12 and cooperating journals 11 and 13, respectively, which are integral with the shell 1. The bearings 10 and 12 are preferrably hydrodynamic bearings of a well known type such as those shown in U.S. Pat. No. 3,093,426. A gear 14 is secured to the mill shell 1 and a pinion 15 is operatively connected to a drive means such as a electric motor (not shown) for engaging gear 14 and rotating the tubular vessel.

As is well known in the art, the shell 1 is lined with mill liners and the mill contains a charge of steel balls. As material is fed into the rotating mill, it is ground by the action of the balls. The material moves from the inlet to the outlet by displacement.

The present invention specifically relates to the journal and end closure of the tubular vessel. According to the prior art as shown in FIG. 2, heavy rolled plate 20 which forms the journal is secured by welding to the end of each section 2 of the mill. A vestigial head 22 is secured by welding 23 perpendicular to the section 20 to form in cross section a T joint. The vestigial head 22 serves to at least partially close the end of the mill. The shell and the vestigial head serve to support the shell of the vessel. At rest, the base metal of section 20, shell 2, vestigial head 22 and weld 23 are subjected to stresses. These stresses vary depending upon the position of the vessel and may range from positive to negative. Thus, as a particular point on the vessel rotates from the 0° position to the 90°, 180° and 270° positions back to the 0° position, that point is subjected to cyclical stresses. Although the stress level at any particular point can be withstood by the various welds, the cyclical stresses present a problem, particularly considering the fact that a tubular vessel is designed to operate for many years and during the rotation of the mill over many years becomes subjected to a great many cycles. Since the magnitude of the stress required to produce failure decreases as the number of cycles of stress increases, the fatigue strength of the various parts 20, 22 and 23 becomes critical. With the prior design shown in FIG. 2, the welds 23 are positioned at the highest level of stress in the journal and end closure of the vessel. Weld 23 is catagorized as a type E Weld by American Welding Society (AWS) which has a very low fatigue stress range.

Since the prior art design locates the welds 23 at the point of highest stress, the weakest point of the journal and end closure becomes these welds. The lower fatigue strength of the welds can result in premature cracking of the welds. These cracks can result in mill leakage which becomes a severe housekeeping problem. More serious is a possible separation of head 22 from the journal 20 which can result in total failure of the mill.

With the present design, the welds have been removed from the area of highest stress. The welds utilized are catagorized as Butt welds or type B welds by AWS which have allowable stress range, two to three times larger than type E welds used in the prior art.

The mill end shown in FIGS. 3 and 4 are substantially the same except that in FIG. 3 the journal for the thrust bearing has been shown. Like numerals reference like parts in the two figures.

In FIGS. 3 and 4 the shell section 2 is secured by welding to a first cylindrical member 30 having an annular projection 32 around its outer periphery. A second cylindrical member 40 is provided having substantially the same outside diameter as the first cylindrical member 30 and also having an annular projection 42 around its outer periphery.

A ring member 50 in the shape of a T in cross section is positioned intermediate the first cylindrical member 30 and second cylindrical member 40. The top piece 51 of the T-shape has a first end secured by welding 52 to the first cylindrical member 30. The second end of the top piece 51 of the T-shape is secured by welding 54 to the second cylindrical member 40. The ring member 50 has an outside diameter substantially the same as the outside diameter of the cylindrical members 30 and 40 so that when all parts are joined, a journal 11 and 13 is formed with all parts coaxially aligned. The journal 11 and 13 are defined in width by the projections 32 and 42 and extends circumferentially around the tubular vessel 1 as shown in FIG. 1. After assembly of the various parts, the journal surface is machined in a manner well known in the art to provide a smooth, round journal 11 or 13.

In FIG. 3, a journal 60 for a thrust bearing is shown as being secured as by welding to the outer end of cylindrical member 40. This journal 60 is U-shaped in cross section and is generally known in the art. Other types of thrust bearing journals can be used within the scope of the present invention. In FIG. 4, the outer end 43 of second cylindrical member 40 forms the free end of the tubular vessel 1.

As shown in FIGS. 3 and 4, a vestigial head 65 at each end of the vessel 1 is formed by an annular plate 66 and the leg 53 of the T-shape of the ring member 50. The annular plate 66 is secured to the leg 53 by welding at 68. The plate 66 serves to at least partially close the end of the tubular vessel.

An end plate 75 is secured by bolts 76 to the free end 69 of vestigial head 65 to further close the end of the mill and form part of the inlet or outlet of the mill.

Figure 7:
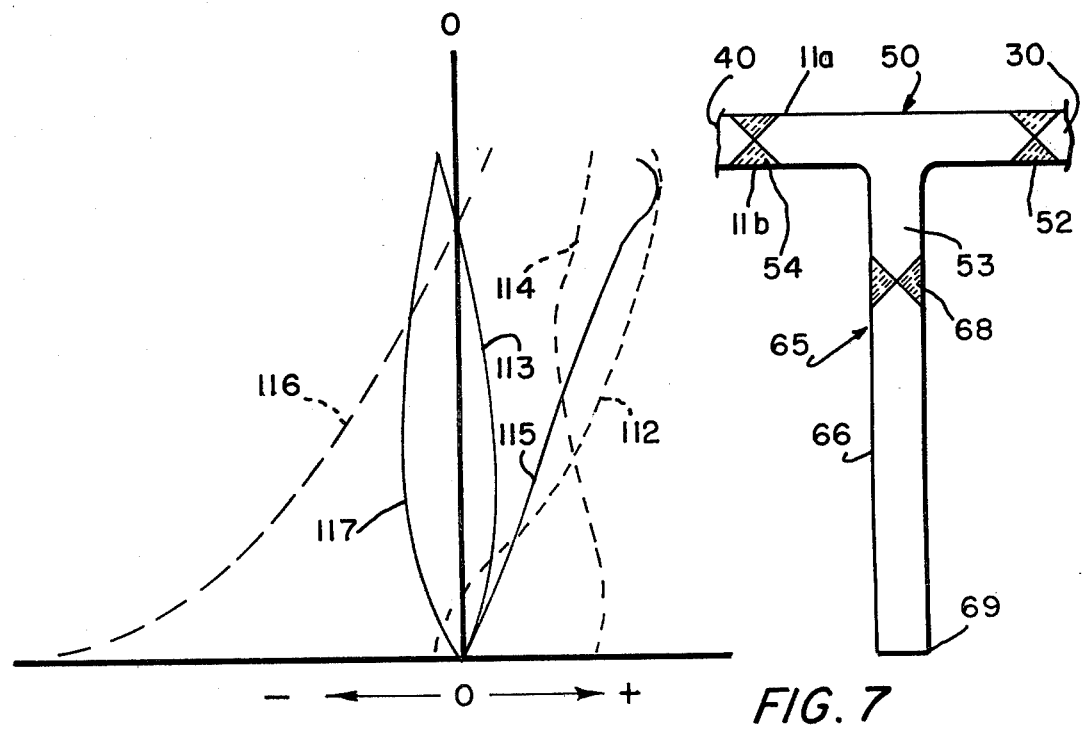
FIG. 7 is a view similar to FIG. 6 but showing the hoop stress and radial stress of the vestigial head of the journal and end closure.

The stresses previously referenced are illustrated in FIGS. 6 and 7. As should become clear, the highest differential levels of stress are encountered at the junction of the vestigial head and the mill shell. With the present invention the weld point of the vestigial head and the shell has been moved away from the highest area of differential stress.

FIG. 6 is a graph of the transverse bending stress in the journal or runner 11 or 13 with the abscissa representing the distance from the free end of the vessel to the vestigial head 65 and the ordinate representing the bending stress in the journal.

In FIG. 6, the dashed lines of the graph represent a fiber on the outer surface 11a of the journal 11 and the solid lines represent a fiber on the inner surface 11b of the journal 11. The dashed line 100 and the solid line 101 represent points along the journal at the 0° or 6 o'clock position. The dashed line 104 and the solid line 105 represent points along the journal 11 at the 45° or 4:30 position, and the dashed line 108 and the solid line 109 represent points along the journal at the 180° or 12 o'clock position. As the mill shell 1 rotates around its own axis and a given point on the mill moves from 0° as shown by lines 100 and 101 to the 45° position as shown by the lines 104 and 105, a fiber on the outer surface of the journal will be subjected to cyclical stress equal to the difference between the lines 100 and 104. A fiber on the inner surface of journal 11 or 13 will be subjected to a cyclical stress equal to the difference between the lines 101 and 105. At the junction of the journal and the vestigial head, this stress total is at its greatest. If a weld were located at the junction of the vestigial head and the mill shell as in the prior art depicted in FIG. 2, the weld would be subjected to the highest stress levels. By the present invention the weld 54 has been moved away from the highest level of stress difference. This permits less massive welds in order to obtain the fatigue strength required to withstand the stresses encountered. Ideally, the weld 54 would be moved even farther away from the vestigial head 65, but economically, this is not feasible.

It should be pointed out that for purposes of clarity, only points at 0°, 45° and 180° have been shown in FIG. 6. Similar lines for other positions of rotation show similar results. FIG. 7 is a graph of the radial stress as shown by solid lines and the hoop stress as shown by dashed lines in the vestigial head 65. The bottom of the graph represents the free end 69 of plate 66 and vestigial head 65. The ordinate represents the radial distance up to the inner surface 11b of journal 11. The abscissa represents the stress level on either side of zero. The line 112 designates the hoop stress for a point on the vestigial head 65 at 0° or the 6 o'clock position. The solid line 113 represents the radial stress for that same point at the same 0° position. The dashed line 114 represents the hoop stress of a point in the vestigial head at the 45° or 4:30 position and the solid line 115 represents the radial stress for that point at that position. Finally, the dashed line 116 and the solid line 117 represent the hoop stress and radial stress, respectively, for a point along the vestigial head 65 at the 180° or 6 o'clock position. As the mill rotates around its own axis and a given point on the vestigial head moves from the 0° position to the 45° position, a fiber will be subjected to a radial stress change equal to the difference between the curves 113 and 115. As can be seen from FIG. 7, when the weld 23 is located directly at the junction of the vestigial head 22 and the journal 20 as in the prior art of FIG. 2, the radial stress difference between the 0° position as represented by line 113 and the radial stress at 45° as represented by line 115 is at its greatest. With the design of the present invention, the weld 68 is moved downwardly away from the area of the greatest stress difference thereby substantially reducing the stress differential. This will enable a reduction in the size of the weld required to withstand the number of cycles which will be encountered by the mill and enable the use of the stronger butt weld 68 instead of the weld 23.

As can be seen from FIG. 7 the hoop stress may increase as the weld 68 is moved away from journal 11, but this type of stress can be withstood by the weld 68 easier than the radial stress. In addition, an optimum point for the weld 68 must be selected keeping in mind the two types of stresses encountered.

In FIG. 7, only the stress levels at 0°, 45° and 180° have been shown for the purposes of clarity. Similar lines could be drawn for other positions of rotation and these lines would show similar results.

The selection of the materials of the ring 50 and members 30 and 40 is an important criteria of the present invention. The cylindrical members 30 and 40 should be a steel having the desired strength and should be rolled in the steel mill in the same direction so that when the flat plate which is rolled to form the cylindrical members, the grain structure of the members 30 and 40 is the same and is substantially parallel to the longitudinal axis of the mill 1.

Most steel inherently has a level of impurities that weakens the material in the direction perpendicular to the grain structure. When heavy type E welds are used to secure two pieces together perpendicular to the grain structure as is the case with the T joint of the prior art shown in FIG. 2, the high impurity levels result in lamilar tears. When combined with the relatively high cyclical stress shown in FIG. 6 at the junction of the vestigial head 22 and journal 20 of the prior art, a weak journal and end closure for a tubular vessel is obtained.

With the present invention the T-shaped ring member 50 is selected from a steel having a lower impurity and sulfur content and better transverse strength than the steel of the cylindrical members 30 and 40. Materials such as "Electrofine" manufactured by Lukens Steel Company are a good selection. The use of a steel with low impurity and sulfur levels and greater transverse strength when combined with the repositioning of the welds as shown in FIGS. 3 and 4 to permit the use of Butt welds serves to substantially reduce the likelihood of lamilar tears being formed in the metal and increases the strength of the weldment.

The T-shaped ring member 50 is made from plate which is rolled to the desired diameter. The plate is then machined to form the T-shape. This formation of the ring member and subsequent machining is a limiting factor on the longitudinal length of the top piece 51 of the member 50 since any additional length of the top piece 51 will have to be machined away to form the leg 53.

The grain structure of the ring member may be either parallel to the longitudinal axis of the vessel 1 and thus parallel to the grain structure of the first cylindrical member 30 and the second cylindrical member or perpendicular to the longitudinal axis of the vessel 1.

In their preferred form the welds 52, 54 and 68 are shaped so that the weld is at the greatest angle feasible to the grain structure of the base metal. Thus the weld 68 is preferrably shaped so that at the leg 53 of T-member 50 an angle of 45° is formed. The same weld 68 is shaped so that at the plate 66 the weld has an angle of 10° which is nearly perpendicular to the grain structure of plate 66. The welds at 52 and 54 each have a narrow angle of 30° total. The proper size and angle of welds helps to substantially reduce the likelihood of lamilar tearing of the base metal.

As an alternate to the present invention, the vestigial head 65 could be formed by a single annular plate welded at its outer perimeter to the first cylindrical member 30 and second cylindrical member 40. A notch could then be machined in this plate to form the T-shape. As a further alternate, the cylindrical members 30 and 40 and the T-shaped ring 50 can have a thickness equal to the cross-sectional thickness at projections 32 and 42. Once the various parts are assembled, the journal 11 or 13 can then be machined.

Although the present invention has been described as an end closure, a similar arrangement could be used to provide a bearing journal and plate at some point between the free ends of the mill as when three bearing supports are desired.

From the foregoing, it is apparent that the objects of this invention have been carried out. A novel journal and end closure for a rotary tubular vessel has been provided which will have increased strength and life when compared with the prior designs.

The foregoing is intended to be merely a description of the preferred form of the invention. However, it is intended that the invention be limited solely by that which is within the scope of the appended claims.

I claim:

1. A tubular article of manufacture designed to be rotated about its own axis comprising:
    a first, hollow, open ended cylindrical member;
    a second, hollow, open ended cylindrical member;
    a hollow, open ended ring member secured by welding to said first and second cylindrical members intermediate and coaxially aligned with said first and second cylindrical members;

said ring member having a projection extending circumferentially around its inside; and an annular plate secured by welding to the projection of said ring member;

said projection having a length sufficiently long to permit the welded junction of said ring member and said annular plate to be positioned away from the area of highest cyclical hoop stress and radial stress when the rotary tubular article is rotated about its own axis.

2. A tubular article of manufacture according to claim 1 wherein the outside diameter of said first and second cylindrical members and said ring member are substantially equal and said first cylindrical member and said ring member and said second cylindrical member and said ring member are secured to each other in an end-to-end relationship to thereby define a cylindrical article of manufacture having a substantially smooth outer surface.

3. A tubular article of manufacture according to claim 2 wherein said ring member is T-shaped in cross section and said first and second cylindrical members are rolled to have a grain structure parallel to the longitudinal axis of the cylindrical article of manufacture.

4. A tubular article of manufacture according to claim 2 wherein said ring member is T-shaped in cross section and is selected from a material having lower impurity levels and better transverse strength than said first and second cylindrical members.

5. A tubular article of manufacture according to claim 1 wherein said ring member has a length sufficiently long to permit the welded juncture of said ring member and said first cylindrical member and the juncture of the said ring member and said second cylindrical member to be positioned away from the area of highest cyclical stress when the tubular article of manufacture is rotated about its own axis.

6. A journal and end closure for a rotary tubular vessel which is adapted to be supported on bearings for rotation about its own axis comprising:

a first, hollow, cylindrical member adapted to form part of the tubular vessel;

a ring member having a T-shape in cross section with a first end of the top piece of the T-shape secured by welding to the first cylindrical member and a second end of the top piece of the T-shape;

a second, hollow cylindrical member having one end secured by welding to the second end of the top piece of the T-shape of said ring member and its other end being a free end of the tubular vessel;

said first cylindrical member, said ring member and said second cylindrical member each having substantially the same outside diameter and being substantially coaxially aligned to form a journal; and annular plate means secured by welding to the leg of the T-shape of said ring member for at least partially closing one end of the tubular vessel;

the top piece of the T-shape of said ring member having a length sufficiently long to permit the welded juncture of said ring member and said first cylindrical member and the welded juncture of said ring member and said second cylindrical member to be positioned away from the area of highest cyclical stress when the rotary tubular vessel is rotated about its own axis.

7. A journal and end closure for a rotary tubular vessel according to claim 6 wherein said first and second cylindrical members are rolled to have a grain structure parallel to the longitudinal axis of the tubular vessel.

8. A journal and end closure for a rotary tubular vessel according to claim 6 wherein said first and second cylindrical members each have an annular projection around their outer periphery to further define the journal of the tubular vessel.

9. A journal and end closure for a rotary tubular vessel according to claim 6 wherein the leg of the T-shape of said ring member has a length sufficiently long to permit the welded juncture of said ring member and said annular plate to be positioned away from the area of highest cyclical hoop stress and radial stress when the rotary tubular vessel is rotated.

10. A journal and end closure for a rotary vessel according to claim 9 wherein said first and second cylindrical members each have an annular projection around their outer periphery to further define the journal of the tubular vessel.

* * * * *